United States Patent [19]

Fukui et al.

[11] 4,306,457

[45] Dec. 22, 1981

[54] LIQUID METER COMPRISING A CIRCUIT FOR REDUCING A DETECTION ERROR RESULTING FROM A VARIABLE FLOW RATE

[75] Inventors: Jun Fukui, Machida; Takeshi Yano, Tokyo; Yutaka Hasegawa, Aichi; Masaharu Sakanaka, Tokyo, all of Japan

[73] Assignees: Nippon Electric Co., Ltd., Tokyo; Aichi Tokei Denki Co., Ltd., Nagoya; Kimmon Manufacturing Co., Ltd., Tokyo, all of Japan

[21] Appl. No.: 94,290

[22] Filed: Nov. 14, 1979

[30] Foreign Application Priority Data

Nov. 17, 1978 [JP] Japan .................................. 53-141926

[51] Int. Cl.³ ............................................. G01F 1/08
[52] U.S. Cl. .................................................. 73/861.77
[58] Field of Search ........... 73/861.77, 861.78, 861.81, 73/861.83; 235/95 FL; 364/510, 571

[56] References Cited

U.S. PATENT DOCUMENTS

| | | | |
|---|---|---|---|
| 3,699,320 | 10/1972 | Zimmerman et al. | 356/571 |
| 3,780,579 | 12/1973 | Barnard | 73/861.77 |
| 3,866,028 | 2/1975 | Schontzler | 364/510 |
| 3,965,341 | 6/1976 | Honey et al. | 73/861.77 |
| 4,118,780 | 10/1978 | Hirano | 364/571 |

Primary Examiner—Herbert Goldstein
Attorney, Agent, or Firm—Laff, Whitesel, Conte & Saret

[57] ABSTRACT

A meter for a liquid, such as water, comprises a measuring circuit (55) for measuring those measuring periods in response to a detection pulse sequence resulting from rotation of a body (30) rotated by the liquid, each of which may be defined either by a period of one complete rotation of the body or a predetermined interval, such as six seconds. The circuit produces measurement signals representative of individual amounts of the liquid used with the individual amounts accompanied by detection errors resulting from a variable flow rate of the liquid. A totalizing circuit (61), which may comprise an ROM or consist of a microcomputer, totalizes the individual amounts with the detection errors reduced.

5 Claims, 12 Drawing Figures

INTERVAL OF A HALF OF ONE COMPLETE ROTATION

LIQUID METER COMPRISING A CIRCUIT FOR REDUCING A DETECTION ERROR RESULTING FROM A VARIABLE FLOW RATE

BACKGROUND OF THE INVENTION

This invention relates to a liquid meter for measuring a total amount of a liquid flowing through a path therefor. It should be noted here that this invention is applicable to a meter for measuring an amount of a liquid although a water meter is described throughout the instant specification.

A conventional water meter comprises an impeller or a turbine wheel in a path of water connected to a conduit or pipe for the water and several conversion or reduction gear trains for transmitting rotation of the impeller to a plurality of pointers or hands of an indicator to make them indicate the amount of the water used. Such conventional water meters have long been used and are featured by the simple structure. The conventional water meter, however, is defective in that a weak current or flow can not be measured because the torque given thereby is insufficient to drive the gears. Several attempts have been made to reduce the driving torque to a minimum. The torque, however, can not be reduced beyond a certain limit insofar as gears are used.

A water meter is known to Applicants which comprises no mechanical gears to remove the above-mentioned defects. More specifically, an electronic circuit is substituted in the known water meter for the gear trains in the sophisticated meter. The known water meter is suitable when the impeller rotates in proportion to an actual amount of water used but fails to indicate a correct amount when the rotation of the impeller is not accurately proportional to the actual amount of the water. This occurs when the weak current flows through the path, as will later be described with reference to one figure of the accompanying drawing. Thus a detection error takes place in the known water meter.

SUMMARY OF THE INVENTION

It is therefore an object of this invention to provide a liquid meter which is capable of reducing a detection error resulting from a rotation error of an impeller.

A liquid meter to which this invention is applicable is for measuring a total amount of a liquid flowing through a path therefor with a variable flow rate to indicate the total amount. The liquid meter comprises a body rotatable in the path, detection pulse producing means responsive to rotation of the body for producing a sequence of detection pulses of a total number related to the total amount, calculating means responsive to the detection pulse sequence for calculating the total amount to produce a total amount signal representative of the total amount, and indicating means responsive to the total amount signal for indicating the total amount. According to this invention, the calculating means comprises measuring means responsive to the detection pulse sequence for measuring a succession of partial measuring periods to produce a succession of measurement signals representative of individual amounts of the liquid flowing through the path in the partial measuring periods, respectively. The individual amounts are subject to detection errors resulting from the variable flow rate. The calculating means further comprises totalizing means for totalizing the individual amounts in consideration of the detection errors to produce the total amount signal with the detection errors reduced.

DESCRIPTION OF THE PREFERRED EMBODIMENTS

Figure 1:
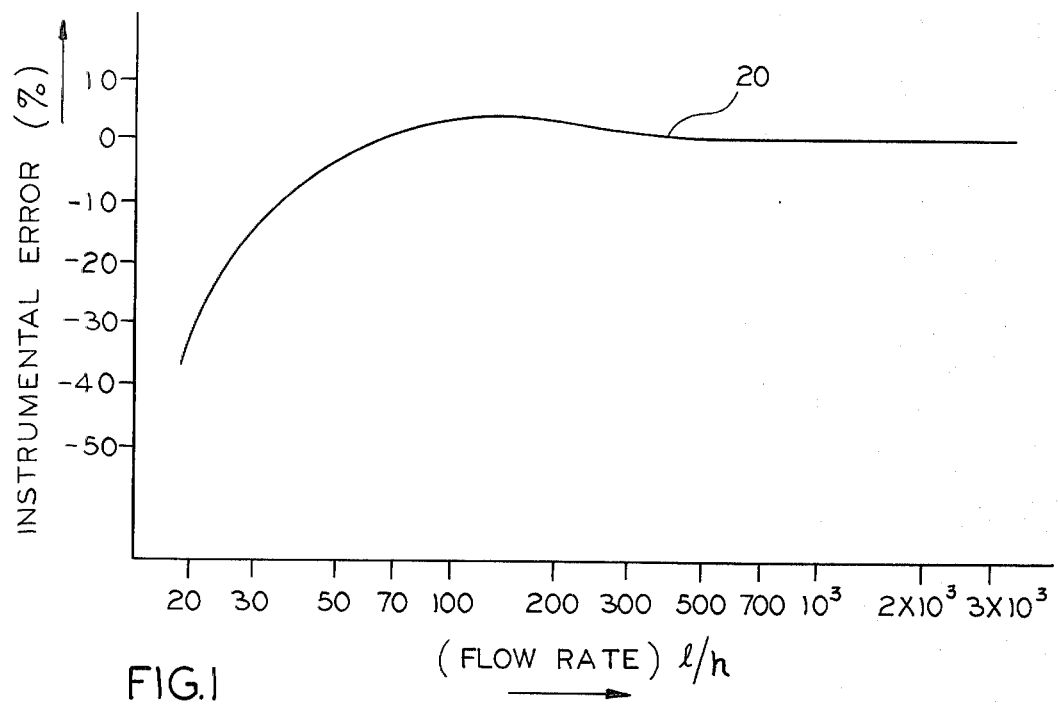
FIG. 1 is a graphical representation of a characteristic of a water meter.

Referring to FIG. 1, a performance curve 20 of a water meter is shown for a better understanding of this invention. The abscissa and the ordinate represent an actual flow rate of water (liters per hour) flowing through a path therefor and an instrumental error (%), respectively. It is readily understood that an amount of the water indicated by the water meter is different from the actual amount when the flow rate is less than 300 liters per hour. Specifically, the indicated amount is lower than the actual amount when the flow rate is less than 30 liters per hour. This shows the fact that rotation of an impeller of the water meter is not always proportional to the actual amount of the water when the water flows through the path with a variable flow rate.

Figure 2:
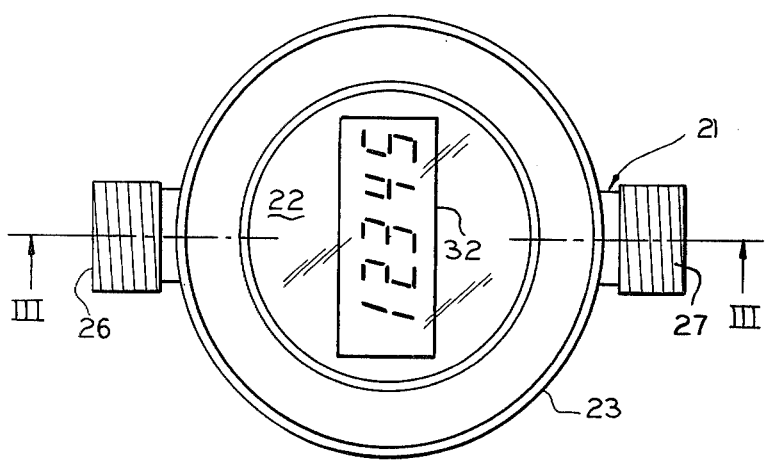
FIG. 2 is a schematic top view of a water meter according to a preferred embodiment of this invention.
Figure 3:
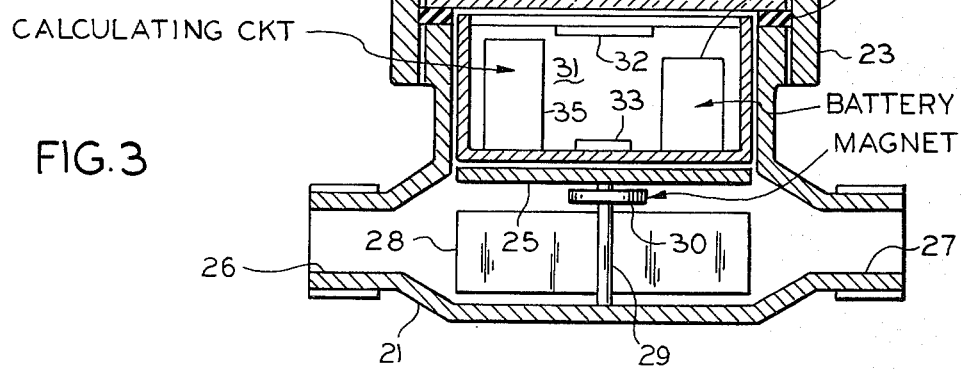
FIG. 3 is a schematic vertical sectional view taken on a plane indicated by a line III—III in FIG. 2.

Referring to FIGS. 2 and 3, a water meter according to a preferred embodiment of this invention is of a type similar to that known as a single-jet water meter in the art and is capable of accurately measuring a total amount of water to indicate the total amount, even when the water flows with a variable flow rate. The water meter comprises a metal casing 21, a glass cover 22, and a nut 23 uniting the casing 21 and the cover 22 water-tight with an annular packing 24 interposed therebetween. A division plate or partition 25 is fixedly placed inside the casing 21 to define therein a lower chamber serving as a path of water between water inlet and outlet ports 26 and 27 of the casing 21 and an upper chamber, where the conventional gear trains and the like mentioned hereinabove are housed in the case of a sophisticated mechanical water meter. An impeller or a multi-blade rotor 28 is rotatable in the lower chamber and has a spindle 29 received by a pair of bearings (not shown) fixed to the casing 21 and the partition 25. Owing to the variable flow rate, the impeller 28 and accordingly the spindle 29 rotates in the path with an accompanying rotation error.

The water meter illustrated in FIGS. 2 and 3 comprises a permanent magnet 30 fixed to the spindle 29 to be rotatable therewith in the lower chamber of the casing 21 and an electronic part 31 housed in a housing therefor, which housing is, in turn, snugly received in the upper chamber. In the illustrated example, the housing is also water-tight and has a window sealed by a glass sheet contiguous to the glass cover 22. An indicator 32 visible through the cover 22 is for indicating the amount of the water used. In the illustrated water meter, the indicator 32 is housed in the housing for the electronic part 31 to be visible also through the glass sheet of the housing and comprises a plurality of luminescent electrodes, such as seven light-emitting diodes or liquid crystal elements for each digit, for providing a visually visible display. The indicator 32 is therefore included in the electronic part for convenience of description.

The electronic part 31 comprises a detection circuit 33 responsive to the rotation of the magnet 30 for producing a sequence of detection pulses DT of a total number related to the total amount and becomes generally greater with time as will later be described in detail, a calculating circuit 35 for calculating the total amount with reference to the total number of the detection pulses to supply the indicator 32 with a total amount signal indicative of the total amount of the water used, and a battery 36 for the indicator 32, the detection circuit 33, and the calculating circuit 35. A combination of the magnet 30, the detection circuit 33, and the calculating circuit 35 corresponds to a set of several conversion gear trains used in a sophisticated mechanical water meter. Preferably, the magnet 30 is of a disk shape having a diameter of about 10 mm and a thickness selected between 2 and 3 mm and produces magnetic fields of 30 and 40 gauses on planes spaced from the disk surface by 6.0 and 5.5 mm, respectively. The battery 36 may, for example, be two lithium batteries that have an electromotive force of 5.6 volts in total and a life of about 10 years even continuously used in the meter.

Figure 4:
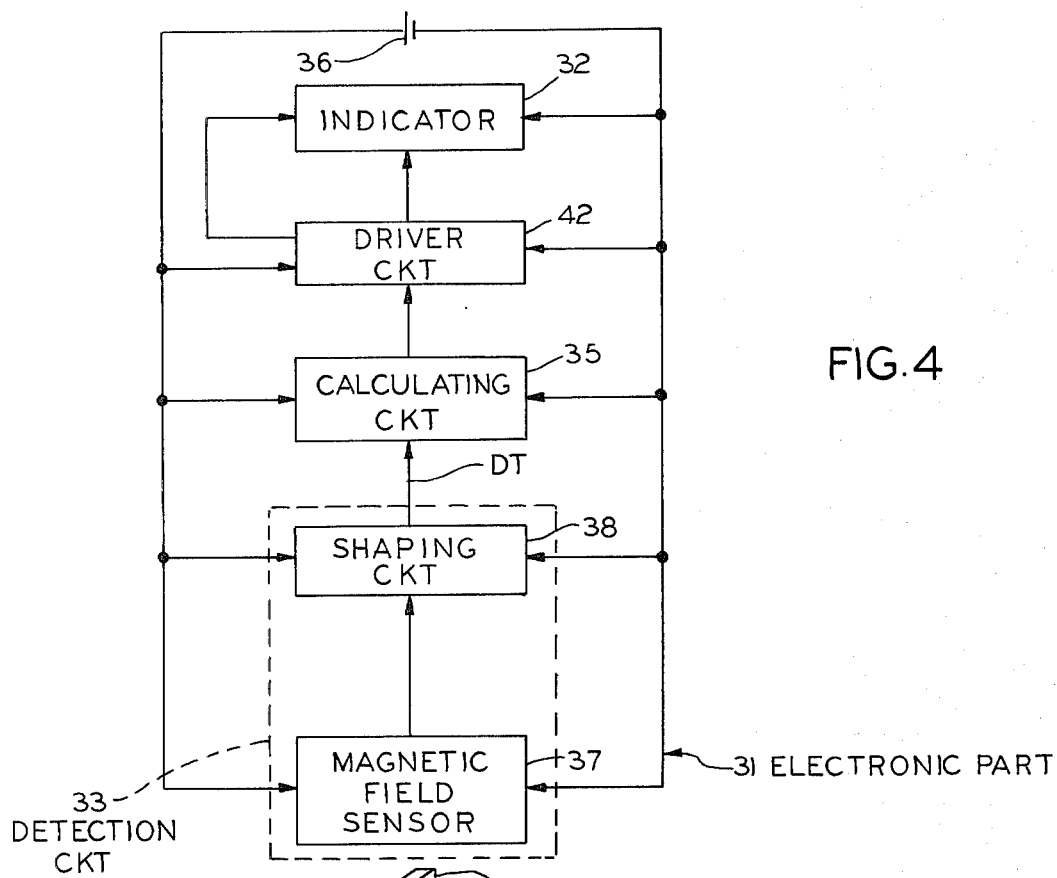
FIG. 4 shows a block diagram of an electronic part for use in the water meter illustrated in FIGS. 2 and 3, with a permanent magnet of the electronic part depicted in a schematic perspective view together with a spindle rotatable with an impeller in the meter.

Referring to FIG. 4, the electronic part 31 of the water meter for use in the preferred embodiment illustrated in FIGS. 2 and 3 comprises similar parts designated by like reference numerals. The detection circuit 33 comprises a magnetic field sensor 37 for producing a sensor output signal variable with the rotation of the magnet 30 and a shaping circuit 38 for shaping the sensor output signal into the detection pulse sequence DT mentioned above. As will later be exemplified, the magnetic field sensor 37 comprises a ferromagnetic magneto-resistive member 39 (FIG. 5) and a bridge circuit member 41 (a portion of FIG. 6). The calculating circuit 35 is responsive to the detection pulse sequence for producing the total amount signal mentioned hereinabove as will become clear as the description proceeds. The indicator 22 is accompanied by a driver circuit 42 responsive to the total amount signal for supplying the indicator 32 with a driving signal for making at least one pertinent light-emitting diodes or the like visible. The magnetic field sensor 37, the shaping circuit 38, and the driver circuit 42 are energized by the battery 36.

Figure 5:
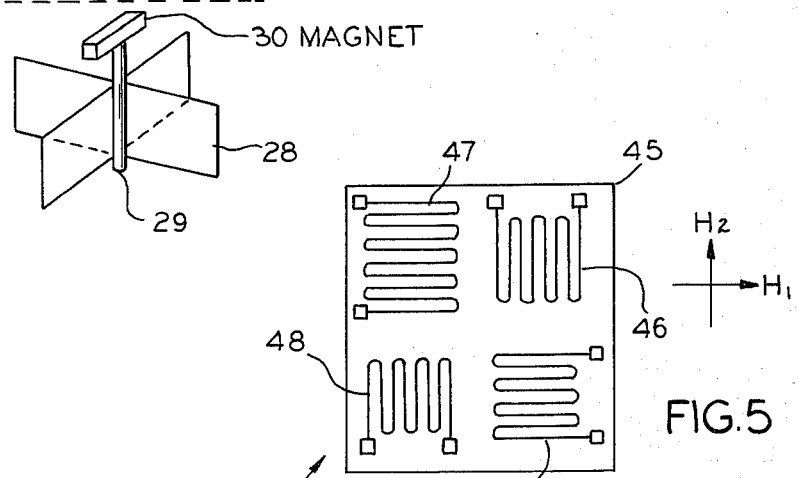
FIG. 5 shows a schematic top view of a ferromagnetic magnetoresistive member of a magnetic field sensor used in the electronic part.

Referring to FIG. 5, an example of the ferromagnetoresistive member 39 of the magnetic field sensor 37 is to be magnetically coupled to the rotatable permanent magnet 30 through the partition 25 and the housing for the electronic part 31. The magnetoresistive member 39 comprises a substrate 45 of a nonmagnetic material, such as a silicon single crystal or glass, having an area of about 5 mm square and a thickness of about 0.5 mm, first through fourth ferromagnetic magnetoresistors or magnetoresistive elements 46, 47, 48, and 49, and a pair of terminals of an electroconductive material, such as gold or copper, for supplying a sense current to each ferromagnetic magnetoresistive element as will presently be described. The elements 46 through 49 may be formed by evaporating a ferromagnetic material, such as an alloy of iron, nickel, and cobalt, onto the substrate 45 to cover the same with a film of a thickness selected between 0.01 and several microns and by etching the film by the known photoresist process into four continuations of primarily parallel lines of the ferromagnetic material. Each line is a few score of microns wide. Each continuation is several millimeters long along the line. A direction of the sense current for each of the first through fourth elements 46 through 49 is defined by the parallel lines of the respective elements. The directions of the sense currents for the first and the second elements 46 and 47 are same as those of the sense current for the third and the fourth elements 48 and 49, respectively. The direction of the sense current for the first or the third element 46 or 48 is perpendicular to that of the sense current for the second or the fourth element 47 or 49. When a magnetic field near a ferromagnetic magnetoresistive element is perpendicular and parallel to the direction of the sense current therefor, the electric resistance of the element decreases and does not, respectively. The resistances of the first and the third elements 46 and 48 decrease in response to a first magnetic field $H_1$ of a few score of gauses perpendicular to the directions of the sense currents therefor and do not respond to a second magnetic field $H_2$ parallel to the directions of the sense currents therefor. Inversely, the second and the fourth elements 47 and 49 reduce the resistances thereof in response to the second magnetic field $H_2$ and do not respond to the first magnetic field $H_1$.

Figure 6:
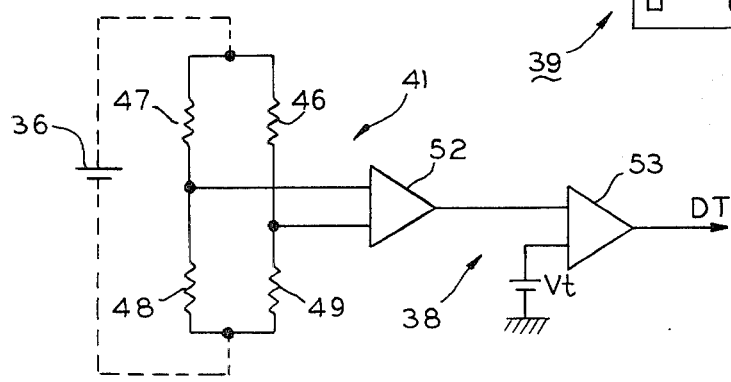
FIG. 6 shows, partly in blocks, the magnetic field sensor, particularly a bridge circuit member thereof, and a shaping circuit for use in the electronic part.

Turning to FIG. 6, an example of the bridge circuit member 41 of the magnetic field sensor 37 for use in combination with the ferromagnetic magnetoresistive member 39 exemplified with reference to FIG. 5 is for supplying the first through fourth ferromagnetoresistive elements 46 through 49 with the sense currents drawn from the battery 36 depicted herein by dashed lines and for deriving a sensor output signal as will shortly become clear. The bridge circuit member 39 comprises a first series connection of the first and the fourth elements 46 and 49 connected to a first point of connection therebetween and a second series connection of the second and the third elements 47 and 48 connected to a second point of connection therebetween. The sensor output signal appears as a potential difference between the first and the second points at which the potentials are variable relative to each other. This is because the resistances of the first and the third elements 46 and 48 or the second and the fourth elements 47 and 49 are simultaneously reduced during a time that the magnet 30 continuously or intermittently rotates. The sensor output signal is substantially sinusoidal and two cycles of the sensor output signal appear during a period of one complete rotation of the magnet 30.

Further referring to FIG. 6, the shaping circuit 38 of the detection circuit 33 comprises a differential amplifier 52 for amplifying the sensor output signal and a wave-form shaper 53 for shaping the amplified sensor output signal by the use of a threshold voltage $V_t$ into the detection pulse sequence DT mentioned hereinbefore. The exemplified wave-form shaper 53 produces two detection pulses during each interval of the one complete rotation of the magnet 30.

Figure 7:
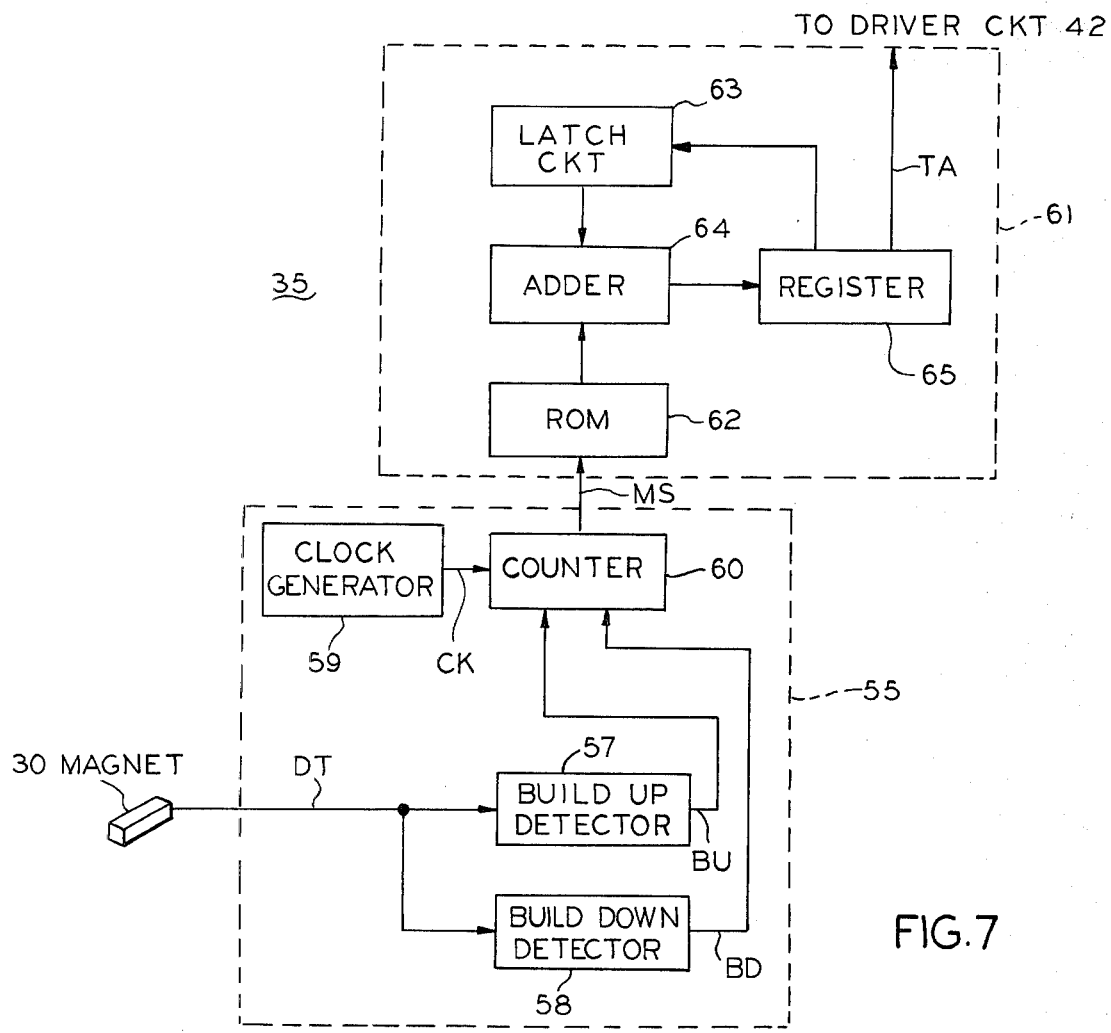
FIG. 7 shows a block diagram of a calculating circuit for use in a water meter according to a first embodiment of this invention.
Figure 8:
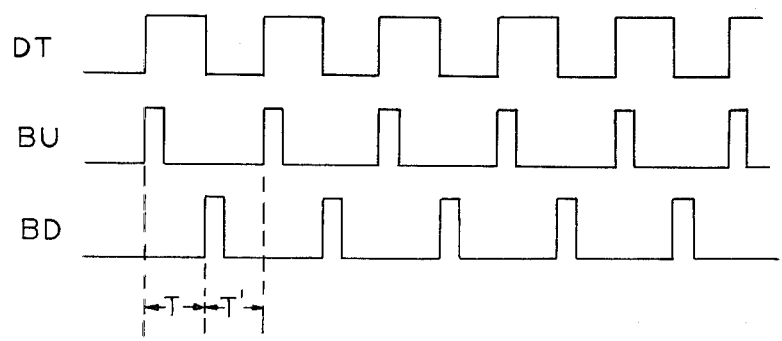
FIG. 8 shows wave-forms for describing operation of a measuring circuit for use in the calculating circuit illustrated in FIG. 7.

Referring now to FIGS. 7 and 8, a calculating circuit 35 for use in a water meter according to a first embodiment of this invention comprises a measuring circuit 55 connected to the shaping circuit 38 of the detection circuit 33 illustrated in FIGS. 3 and 4 for measuring successive intervals T, each equal to a period of a quarter of one complete rotation of the magnet 30, as a succession of partial measuring periods. Each of the partial measuring periods is widely variable depending of the flow rate. An individual amount of the water flowing through the path during each interval is also variable as readily understood from FIG. 1. When the detection circuit 33 comprises the first through fourth elements 46 through 49 illustrated in FIGS. 5 and 6, the measuring circuit 55 is supplied with two of detection pulses DT during one complete rotation interval. The detection pulses DT are supplied to build-up and build-down detectors 57 and 58 for detecting build-up and build-down of the detection pulses to produce build-up and build-down pulses BU and BD, respectively. Each of the build-up and build-down pulses BU and BD appears in every other partial measuring period. This means that measurement is made in every other partial measuring period in the exemplified measuring circuit 55. The quarter of one complete rotation interval T is equal to a period between a leading edge of the build-up pulse BU and a leading edge of the build-down pulse BD or between trailing edges of the build-up and build-down pulses BU and BD. Thus, the build-up and build-down pulses BU and BD serve to specify the quarter of one complete rotation interval T of the magnet 30 and will be therefore called a pair of rotation pulses herein.

Referring to FIG. 7 again, the measuring circuit 55 comprises a clock generator 59 for generating a sequence of clock pulses having a repetition frequency of, for example, 2 Hz and a counter 60 responsive to the rotation pulse pair for counting the clock pulses CK to produce, as measurement signals MS, those numbers of the clock pulses which are counted during the respective intervals successively specified by the rotation pulse pairs. Each measurement signal MS is representative of an individual amount of water flowing through the path in a partial measuring period T followed by the remaining partial measuring period T'. The individual amount is subject to a detection error resulting from the variable flow rate. Thus, the individual amounts liably accompanied by a plurality of detection errors are converted into a succession of the measurement signals.

Further referring to FIG. 7, the calculating circuit 35 comprises a totalizing circuit 61 for totalizing the individual amounts represented by the measurement signals MS in consideration of the detection errors to produce a total amount signal TA representative of the total amount with the detection errors reduced. More specifically, the totalizing circuit 61 comprises a read-only memory (an ROM) 62 connected to the counter 60 of the measuring circuit 55 and having a predetermined number of addresses, for example, thirteen addresses, for memorizing error-reduced signals representative of error-reduced numbers. The error-reduced numbers are predetermined for various values of the individual amounts. When accessed by the measurement signals MS representative of the pulse numbers of the clock pulses counted during every other partial measuring period, the ROM 62 produces the error-reduced signals.

Figure 9:
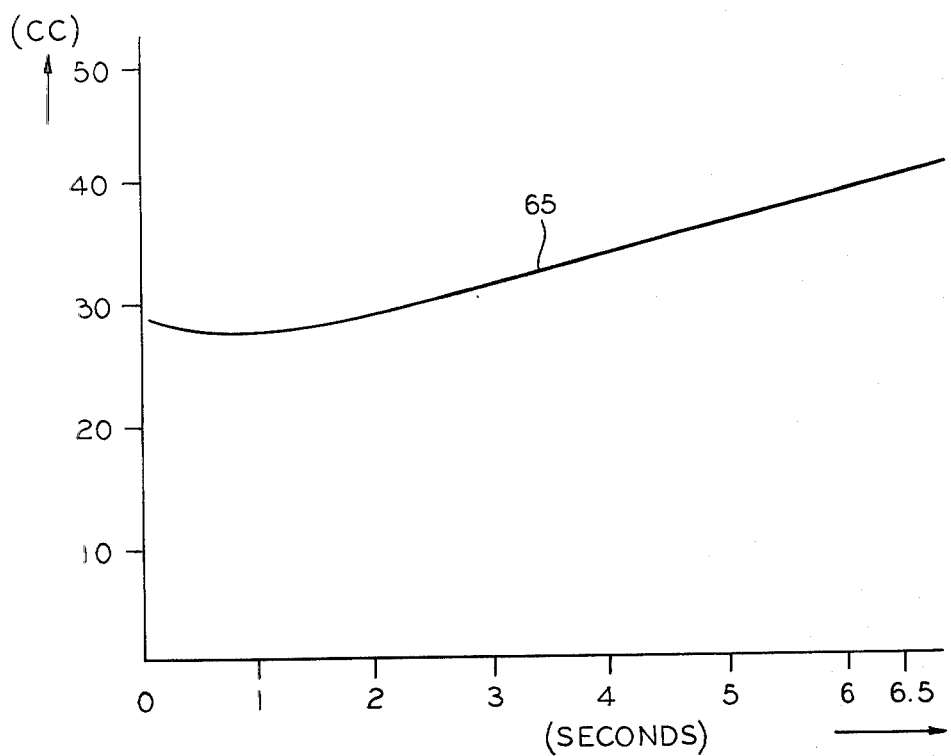
FIG. 9 exemplifies a characteristic of a water meter for describing operation of an ROM for use in the calculating circuit illustrated in FIG. 7.

Temporarily referring to FIG. 9, a curve 65 exemplifies the relationship between intervals (seconds) of a half of one complete rotation of the magnet 30 or twice the partial measuring period, and error-reduced amounts (cc) of water actually flowing during the respective intervals. The error-reduced amounts are equal to 28.0, 27.5, 27.7, 28.6, 29.5, 30.7, 31.5, 32.6, 34.0, 35.3, 36.6, 38.0, and 39.4 (cc) when the intervals are 0.5, 1.0, 1.5, 2.0, 2.5, 3.0, 3.5, 4.0, 4.5, 5.0, 5.5, 6.0, and 6.5 (seconds), respectively.

Turning back to FIG. 7, the ROM 62 memorizes, as the error-reduced signals, the error-reduced amounts exemplified with reference to FIG. 9 in first through thirteenth addresses which correspond to the clock pulse numbers of the clock pulses counted during the every other partial measuring period. As exemplified in Table 1, the first address is accessed when an access signal is given a binary value of "0001" that represents the interval of 0.5 (second). Likewise, the second through thirteenth addresses are accessed when address signals are given binary values of "0010" through "1101" that represent the intervals of 1 through 6.5 (seconds), respectively. It is obvious that the counter 60 counts the clock pulses of 2 Hz in every interval of 0.5 (second) in this example. The respective error-reduced signals are memorized in the first through thirteenth addresses in a binary-coded decimal fashion, as exemplified in Table 1. For example, an error-reduced amount of "28.0" (cc) in memorized in the first address in the manner of "0010 1000 0000".

TABLE 1

| interval of a quarter of one complete rotation (seconds) | addresses | error reduced amounts (cc) /access | BCD codes | | |
|---|---|---|---|---|---|
| 0.5 | 0001 | 28.0 | 0010 | 1000 | 0000 |
| 1 | 0010 | 27.5 | 0010 | 0111 | 0101 |
| 1.5 | 0011 | 27.7 | 0010 | 0111 | 0111 |
| 2 | 0100 | 28.6 | 0010 | 1000 | 0110 |
| 2.5 | 0101 | 29.5 | 0010 | 1001 | 0101 |
| 3 | 0110 | 30.7 | 0011 | 0000 | 0111 |
| 3.5 | 0111 | 31.5 | 0011 | 0001 | 0101 |
| 4 | 1000 | 32.6 | 0011 | 0010 | 0110 |
| 4.5 | 1001 | 34.0 | 0011 | 0100 | 0000 |
| 5 | 1010 | 35.3 | 0011 | 0101 | 0011 |
| 5.5 | 1011 | 36.6 | 0011 | 0110 | 0110 |
| 6 | 1100 | 38.0 | 0011 | 1000 | 0000 |
| 6.5 | 1101 | 39.4 | 0011 | 1001 | 0100 |

Further referring to FIG. 7, the totalizing circuit 61 is for totalizing the error-reduced amount during the remaining ones of the partial measuring periods. The totalizing circuit comprises a latch circuit 63 for latching, as will presently be described, a prior amount signal representative of a prior amount previously totalized by the totalizing circuit 61. Responsive to the error-reduced signal from the ROM 62 and the prior amount signal from the latch circuit 63, an adder 64 in the totalizing circuit 61 adds the error-reduced number to the prior amount to supply a register 65 with a renewed total amount signal TA representative of a renewed total amount. The renewed total amount signal TA kept in the register 65 is supplied to the latch circuit 63 and to the driver circuit 42. The latch circuit 63 latches the renewed total amount signal as a prior amount signal for a next following error-reduced signal.

Figure 10:
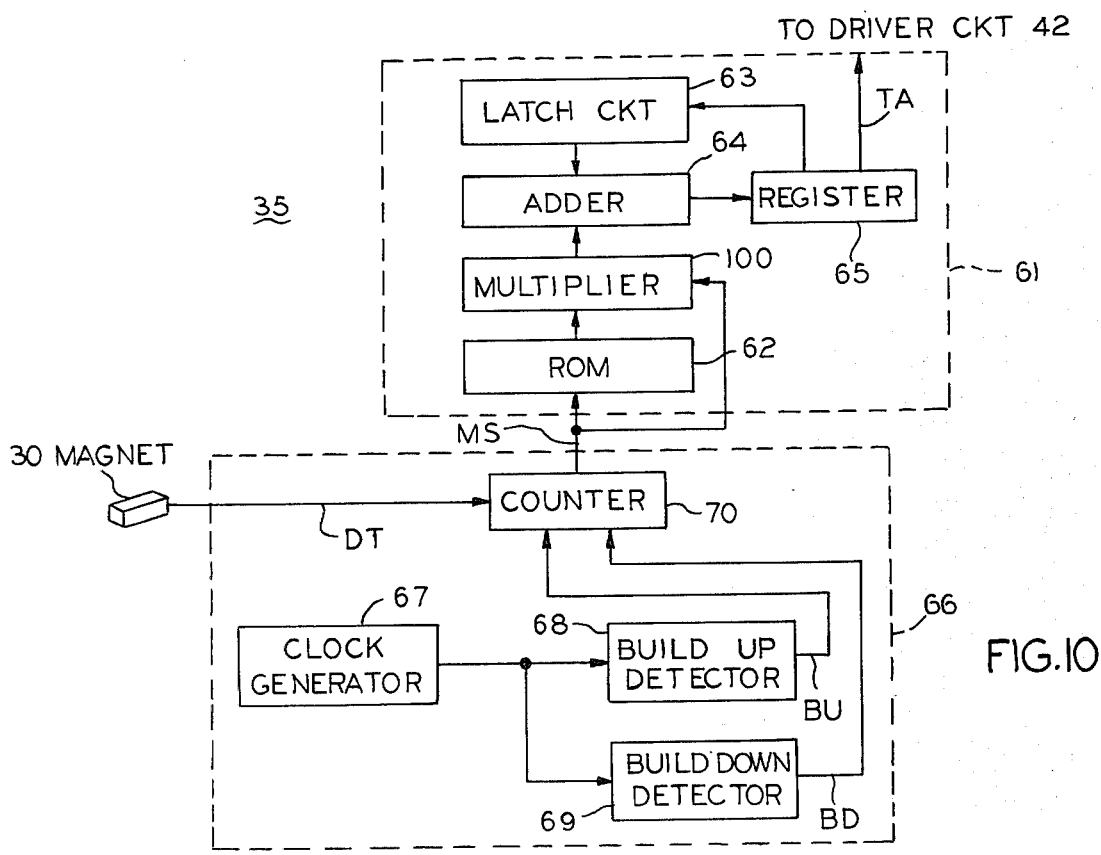
FIG. 10 shows a block diagram of a calculating circuit for use in a water meter according to a second embodiment of this invention.

Referring to FIG. 10, a calculating circuit 35 for use in a water meter according to a second embodiment of this invention comprises a totalizing circuit 61 to supply the driver circuit 42 with a totalizing signal TA. A measuring circuit 66 comprises a clock generator 67 for generating a sequence of clock pulses of a predetermined repetition frequency, such as 1/12 Hz, of a duty ratio of 50%. Build-up and build-down detectors 68 and 69 are connected to the clock generator 67 for detecting build-up and build-down of the clock pulses to produce build-up and build-down pulses BU and BD, respectively. The build-up and build-down pulse pairs define a sequence of predetermined timing periods, for example, 6 seconds. Each of the timing periods defines a partial measuring period that is independent of the flow rate. A combination of the clock generator 67 and the build-up and the build-down detectors 68 and 69 serves as a timing pulse generator for generating the timing pulse sequence for defining the partial measuring periods. The measuring circuit 66 further comprises a counter 70 connected to the shaping circuit 38 of the detection circuit 33 and the timing pulse generator. The counter 70 counts the detection pulses supplied from the shaping circuit 38 during the respective timing periods to produce, as measurement signals MS, those numbers of the detection pulses which are counted during the respective periods. The measurement signals MS are representative of individual amounts of water flowing during the respective timing periods. In other words, the individual amounts are represented by those numbers of the detection pulses which are counted in the respective timing periods.

Further referring to FIG. 10, an ROM 62 is supplied with the measurement signals MS as address signals. The ROM 62 has first through fifteenth addresses represented by binary values of "0001" through "1111", respectively, as exemplified in Table 2. In the first through fifteenth addresses of the ROM 62, error-reduced amounts of 42.0 through 27.6 (cc) are memorized as error-reduced signals in a binary-coded decimal fashion, as also exemplified in Table 2. For example, when the counter 70 counts a single one of the detection pulses DT during the timing period, an error-reduced amount of 42.0 (cc) is read out of the first address to produce the error-reduced signal of "0100 0010 0000". Likewise, the pulse numbers of 2, 3, . . . , and 15 enable the error-reduced numbers of 33.7, 29.8, . . . , and 27.6 to be read out of the second, third, . . . , fifteenth addresses, respectively.

TABLE 2

| pulses /six seconds | addresses | error reduced amounts (cc) /access | BCD codes | | |
|---|---|---|---|---|---|
| 1 | 0001 | 42.0 | 0100 | 0010 | 0000 |
| 2 | 0010 | 33.7 | 0011 | 0011 | 0111 |
| 3 | 0011 | 29.8 | 0010 | 1001 | 1000 |
| 4 | 0100 | 28.4 | 0010 | 1000 | 0100 |
| 5 | 0101 | 27.9 | 0010 | 0111 | 1001 |
| 6 | 0110 | 27.5 | 0010 | 0111 | 0101 |
| 7 | 0111 | 27.4 | 0010 | 0111 | 0100 |
| 8 | 1000 | 27.4 | 0010 | 0111 | 0100 |
| 9 | 1001 | 27.3 | 0010 | 0111 | 0011 |
| 10 | 1010 | 27.2 | 0010 | 0111 | 0010 |
| 11 | 1011 | 27.3 | 0010 | 0111 | 0011 |

TABLE 2-continued

| pulses /six seconds | addresses | error reduced amounts (cc) /access | BCD codes | | |
|---|---|---|---|---|---|
| 12 | 1100 | 27.4 | 0010 | 0111 | 0100 |
| 13 | 1101 | 27.5 | 0010 | 0111 | 1001 |
| 14 | 1110 | 27.6 | 0010 | 0111 | 1010 |
| 15 | 1111 | 27.6 | 0010 | 0111 | 1010 |

Referring to FIG. 10 again, a multiplier 100 is connected to the ROM 62 and the counter 70 for multiplying the error-reduced amounts by numbers of the addresses to produce modified amount signals representative of modified amounts. The modified amount signals are supplied to the adder 64 to calculate the total amount in the manner described with reference to FIG. 7.

Figure 11:
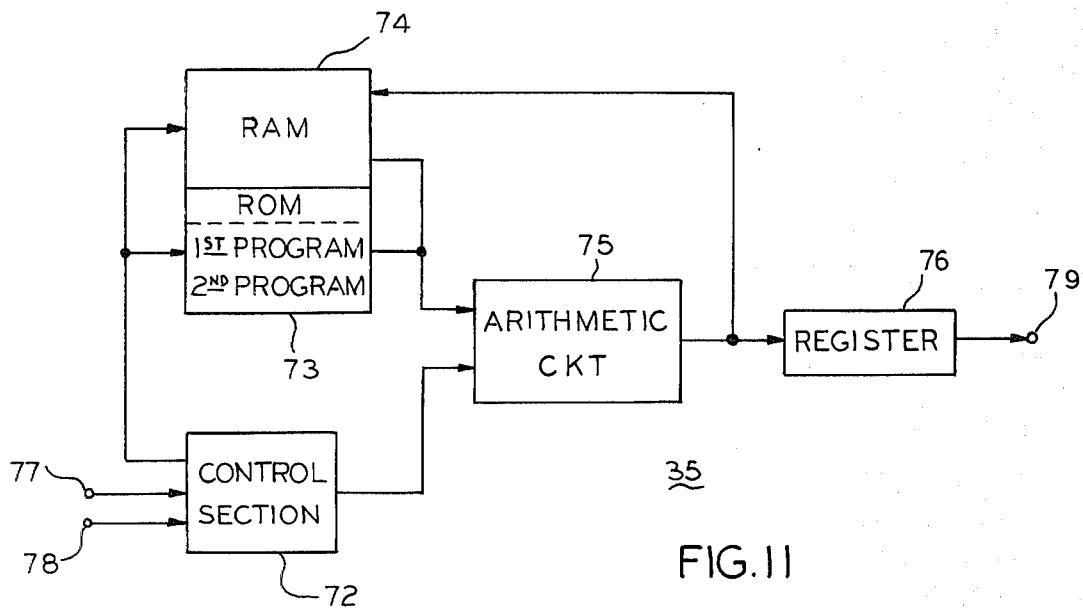
FIG. 11 shows a block diagram of a calculating circuit for use in a water meter according to a third embodiment of this invention.

Referring to FIG. 11, a calculating circuit 35 for use in a water meter according to a third embodiment of this invention is for executing calculation illustrated with reference to FIG. 7, by the use of a microcomputer. As known in the art, the microcomputer comprises a control section 72, a read-only memory (ROM) 73, a random-access memory (RAM) 74, an arithmetic circuit 75, and a register 76. The control section 72 is connected to an input port 77 for an adjusting data signal as will later be described and to the detection circuit 33 through an interruption terminal 78. The control section 72 is operatively coupled to the arithmetic circuit 75, the ROM 73, and the RAM 74. The ROM 73 memorizes a first program for measuring an interval of a quarter of one complete rotation of the magnet 30 and a second program for executing calculation of a total amount of the water used in accordance with a predetermined formula F(T). The RAM 74 is operatively coupled to the arithmetic circuit 75 to memorize results of calculation supplied from the arithmetic circuit 75. The exemplified RAM 74 memorizes a prior total amount A in a preselected address, as will later be described. Coupled to the arithmetic circuit 75, the register 76 is responsive to a total amount signal representative of the total amount for transferring the total amount signal to the driver circuit 42 through an output port 79.

Figure 12:
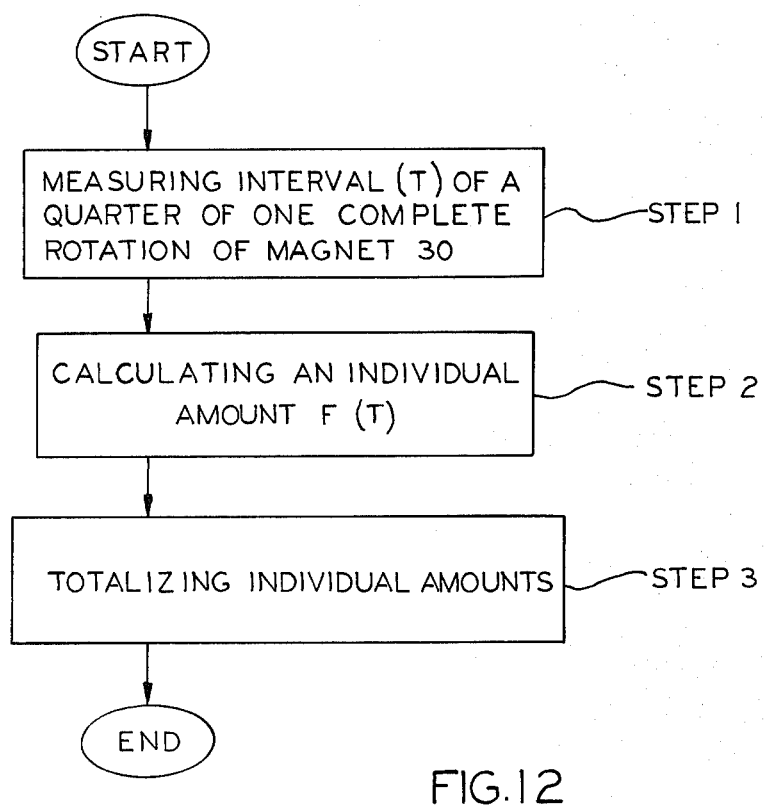
FIG. 12 shows a flow chart for describing the operation of the calculating circuit illustrated in FIG. 11.

Referring to FIGS. 11 and 12, the control section 72 reads the first program out of the ROM 73 in response to the detection pulse sequence and makes the arithmetic circuit 75 execute the first program to measure an interval of the quarter of one complete rotation of the magnet 30, as shown by Step 1 in FIG. 12. Like in FIG. 7, the respective intervals are represented by those pulse numbers of clock pulses of a predetermined repetition frequency which serve as measurement signals. Therefore, the control section 72 cooperates with the first program to form a measuring circuit for measuring partial measuring periods, each of which is defined by an intervals of the quarter of one complete rotation of the magnet 30.

When the interval of the quarter of one complete rotation is measured, the control section 72 makes the ROM 73 supply the arithmetic circuit 75 with a sequence of program signals in accordance with the second program. The arithmetic circuit 75 executes the second program in response to the program signal sequence and to produce the total amount signal. Thus, the control section 75 cooperating with the second program serves to calculate the total amount. In the example, the arithmetic circuit 75 calculates individual amounts of water flowing during the respective intervals in accordance with the predetermined formula F(T), as shown by Step 2 in FIG. 12. Thereafter, the arithmetic circuit 75 adds each of the individual amounts to the prior total amount A read out the RAM 74 to supply the driver circuit 42 with the total amount signal through the output port 79, as shown by Step 3 in FIG. 12. It is possible to slightly modify the predetermined formula F(T) so as to adjust the same to individual water meters by supplying the control section 72 with the adjusting data signal through the input port 77. In this case, the input port 77 is rendered on or off. More specifically, the predetermined formula F(T) is given by:

$$F(T) = A_0 + A_1 T + A_3(T^n + A_2) \qquad (1)$$

where $A_0$, $A_1$, $A_2$, and $A_3$ represent constants and n, an integer. The constants $A_0$, $A_1$, $A_2$, and $A_3$ are 22.8000, 2.6530, 0.6105, and 3.2967, respectively, when the relationship between the intervals of the quarter of one complete rotation and the individual amounts flowing during the respective intervals are represented by the curve 65 shown in FIG. 9. When n=2, Equation (1) is rewritten into:

$$F(T) = 22.8000 + 2.6530T + 3.2967/(T^2 + 0.6105).$$

As described above, the constants $A_0$–$A_3$ and the integer n should be prepared on calculation of Equation (1). In this example, these numbers, such as the constants and the integer, are memorized in the ROM 73. The microcomputer may, for example, be $\mu$PD546C which is manufactured and sold by Nippon Electric Co., Ltd., Japan (cf "ELECTRON DEVICE BOOK '78" published by Nippon Electric Co., Ltd., page 645) and which comprises an ROM of a bit capacity of 2000×8 and an RAM of a bit capacity of 96×4. Although both the first program and the second program are executed by the microcomputer in a water meter according to the third embodiment, the microcomputer may execute the second program alone when the intervals of the quarter of one complete rotation are previously measured by a measuring circuit such as FIG. 7.

The numbers and the formula for calculation may be determined by actual measurement at each individual water meters or may be numbers that average actual data derived from a plurality of identical water meters and a formula that holds on an average therefor, respectively.

It is also possible to execute calculation described with reference to FIG. 11 by a microcomputer using a program different from the first and the second programs described in FIGS. 11 and 12.

While this invention has thus far been described in conjunction with a few embodiments thereof, it is obvious to those skilled in the art that this invention can be put into practice in various manners. For example, this invention is applicable to an oil meter or the like. Two counters, which are alternately put into operation, may be substituted for a single counter 60 or 70 to give access to the ROM 62 in every partial measuring period. The rotation pulse circuit or the timing circuit may be replaced by an analog integration circuit. In addition, it is possible to detect a normal and an inverse flow by the use of a sensor comprising three magnetoresistive elements azimuthally equally spaced relative to each other. Use is possible of a sensor optically coupled to an impeller.

What is claimed is:

1. A liquid meter for measuring a total amount of a liquid flowing, with a variable flow rate, through a path and to indicate said total amount, said meter comprising:

magnetic body means rotatable in said path in response to the amount of said liquid flow through the path, the rotation of said magnetic body means being accompanied by a variable instrumental error which varies in accordance with said flow rate;

housing means defining a hollow space adjacent said magnetic body means;

detection pulse producing means in said hollow space and magnetically coupled to said magnetic body means for producing a sequence of detection pulses, the number of said pulses being related to the amount of said liquid flow, said number of detection pulses generally increasing toward a total number related to said total amount;

counting means located in said hollow space and connected to said detection pulse producing means for counting the number of detection pulses produced during each of a plurality of predetermined partial measuring periods to successively produce measurement signals which are representative of individual amounts of said liquid flow, said individual amounts being subject to detection errors resulting from an accumulation of said instrumental errors in each of said partial measuring period;

means located in said hollow space for analyzing the number of pulses counted by said counting means during each of said partial periods and correcting for said errors to give a corrected flow rate in each of said partial periods;

totalizing means located in said hollow space and responsive to said analyzing means for totalizing said individual amounts in consideration of said detection errors in order to produce a total amount signal which is representative of said total amount; and indicating means responsive to said total amount signal for indicating said total amount.

2. A liquid meter as claimed in claim 1, wherein said analyzing means comprises:

first means connected to said counting means and having a plurality of addresses for memorizing error-reduced number signals representative of error-reduced numbers, respectively, said error-reduced numbers being predetermined for various values of the individual amounts; and said totalizing means comprises second means responsive to said error-reduced signals for totalizing said error-reduced numbers to produce said total amount signal with said detection errors reduced.

3. A liquid meter as claimed in claims 1 or 2, wherein said counting means comprises:

a timing pulse generator for generating a sequence of timing pulses of a predetermined timing period that specify each of said partial measuring periods; and means connected to said detection pulse producing means and said timing pulse generator for counting the detection pulses during the respective timing periods to produce said measurement signals with said individual amounts represented by those numbers of the detection pulses which are counted in the respective timing periods.

4. A liquid meter as claimed in claim 1, wherein said detection pulse producing means comprises:
- a substrate of a nonmagnetic material having a principal surface;
- first, second, third, and fourth electroresistive elements magnetically coupled to said magnetic body means and placed on said principal surface for producing a sensor output signal in response to the rotation of said magnetic body means, said first through fourth elements being arranged so that two cycles of said sensor output signals appear during one complete rotation of said magnetic body means; and
- shaping means for shaping said sensor output signal into said detection pulse sequence.

5. A liquid meter as claimed in claim 4, wherein said indicating means is located in said hollow space.

* * * * *